(12) United States Patent
Voisine et al.

(10) Patent No.: US 10,598,219 B2
(45) Date of Patent: Mar. 24, 2020

(54) BEARING AND SEALING ARRANGEMENT FOR JOINTS IN HEAVY DUTY VEHICLES

(71) Applicant: Roller Bearing Company of America, Inc., Oxford, CT (US)

(72) Inventors: James Voisine, Burlington, CT (US); Bradley Smith, Glastonbury, CT (US); D'Artagnan Clark, Meriden, CT (US); Charles Condon, III, Harwinton, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 16/131,867

(22) Filed: Sep. 14, 2018

(65) Prior Publication Data

US 2019/0085900 A1    Mar. 21, 2019

Related U.S. Application Data

(60) Provisional application No. 62/721,136, filed on Aug. 22, 2018, provisional application No. 62/559,699, filed on Sep. 18, 2017.

(51) Int. Cl.
*F16C 23/08* (2006.01)
*F16C 23/04* (2006.01)
(Continued)

(52) U.S. Cl.
CPC .......... *F16C 23/045* (2013.01); *F16C 23/046* (2013.01); *F16C 33/102* (2013.01);
(Continued)

(58) Field of Classification Search
CPC .... F16C 23/045; F16C 23/046; F16C 33/102; F16C 33/74; F16C 33/743; F16C 2326/01; F16C 2326/20; F16C 2361/41
See application file for complete search history.

(56) References Cited

U.S. PATENT DOCUMENTS

| 3,912,300 A | 10/1975 | Bryan, Jr. | |
| 4,819,854 A * | 4/1989 | Schmehr | F16C 33/74 251/315.01 |

(Continued)

FOREIGN PATENT DOCUMENTS

| EP | 2333362 A1 | 6/2011 |
| EP | 2933510 A2 | 10/2015 |

(Continued)

OTHER PUBLICATIONS

Extended European Search Report issued in corresponding EP Application No. 18194779.7, dated Nov. 6, 2018, pp. 1-9.

*Primary Examiner* — Phillip A Johnson
(74) *Attorney, Agent, or Firm* — Murtha Cullina LLP

(57) ABSTRACT

A bearing and seal arrangement for joints in heavy duty vehicles includes two spherical bearing each having an outer ring surrounding an inner member with lubricious liner disposed therebetween. One of the spherical bearings has a seal receiving area having an axially extending width that is greater than that of the other spherical bearing. The spherical bearings are aligned coaxially with one another. One seal receiving areas has a flexible double lipped annular seal and a scraper seal positioned therein. The scraper seal is positioned axially outward from the flexible double lipped annular seal. The other seal receiving area has a boot seal positioned therein.

28 Claims, 15 Drawing Sheets

(51) Int. Cl.
    *F16C 33/76* (2006.01)
    *F16C 33/10* (2006.01)
    *F16C 33/74* (2006.01)

(52) U.S. Cl.
    CPC .............. *F16C 33/74* (2013.01); *F16C 33/76* (2013.01); *F16C 33/743* (2013.01); *F16C 2326/01* (2013.01); *F16C 2326/20* (2013.01)

(56) References Cited

U.S. PATENT DOCUMENTS

| | | | |
|---|---|---|---|
| 4,836,694 A * | 6/1989 | Schmehr | F16C 33/74 |
| | | | 277/398 |
| 5,211,261 A | 5/1993 | Garberg | |
| 6,206,118 B1 | 3/2001 | Menze et al. | |
| 7,743,869 B2 | 6/2010 | Flournoy, Jr. et al. | |
| 8,646,567 B2 | 2/2014 | Werner et al. | |
| 8,967,868 B2 | 3/2015 | Wright | |
| 2012/0119567 A1 | 5/2012 | Johannsen et al. | |
| 2014/0093198 A1* | 4/2014 | Voisine | F16C 33/102 |
| | | | 384/137 |
| 2015/0137486 A1 | 5/2015 | Smith et al. | |
| 2015/0226256 A1* | 8/2015 | Voisine | F16C 33/74 |
| | | | 384/147 |
| 2016/0169284 A1 | 6/2016 | Clark et al. | |
| 2016/0229243 A1 | 8/2016 | Wagner | |
| 2016/0265665 A1 | 9/2016 | Desjardins et al. | |
| 2016/0290507 A1 | 10/2016 | Chapagain et al. | |
| 2018/0003234 A1 | 1/2018 | Voisine | |

FOREIGN PATENT DOCUMENTS

| | | |
|---|---|---|
| EP | 3213939 A1 | 9/2017 |
| EP | 3263927 A1 | 1/2018 |
| EP | 3194188 B1 | 6/2018 |
| WO | 2011150653 A1 | 12/2011 |
| WO | 2014089434 A1 | 6/2014 |
| WO | 2016188526 A1 | 12/2016 |

* cited by examiner

BEARING AND SEALING ARRANGEMENT FOR JOINTS IN HEAVY DUTY VEHICLES

CROSS REFERENCE TO RELATED APPLICATIONS

This application claims priority to U.S. Provisional Patent Application Ser. No. 62/721,136, entitled "BEARING AND SEALING ARRANGEMENT FOR LARGE WHEEL LOADER BUCKET LEVEL LINKS," filed Aug. 22, 2018. This application also claims priority to U.S. Provisional Patent Application Ser. No. 62/559,699, entitled "BEARING AND SEALING ARRANGEMENT FOR A HAUL TRUCK ARTICULATED JOINT," filed Sep. 18, 2017, the subject matter of both aforementioned applications are hereby incorporated by reference in their entireties.

FIELD OF THE INVENTION

The present invention relates generally to sealed spherical bearings in joints for heavy duty vehicles, and more particularly to multiple seals positioned in each of two self-lubricating spherical bearings, a respective one of which is disposed in a respective one of two devises of an articulated joint for a heavy haul truck or on the back side of a bucket for a large mining wheel loader.

BACKGROUND OF THE INVENTION

As shown in FIG. 1, a heavy haul articulating dump truck is generally designated by the numeral 100. The articulating dump truck 100 is a vehicle that is constructed or assembled from two or more sections such as a cab 101 and a dump trailer 102. The cab 101 and the dump trailer 102 are pivotally joined together by an articulated joint 10. The dump trailer 102 is pivotal in the direction of the arrow D to dump a load therein and then return to a horizontal seated position. The articulated joint configuration provides greater capacity and flexibility of movement of the articulating vehicle dump truck thereby facilitating the control, steering and turning. While the articulated joint is shown in a articulated dump truck, such articulating joints are employed in other articulating vehicles including scrapers, tractor-trailers, heavy construction vehicles, buses, trams and trains. Typically, the articulated joint pivotally joins a structural frame member of each of the adjoining sections of the articulating vehicle by employing a bearing, for example a spherical plain bearing, received within the structural frame members. The articulated joint 10 may provide a permanent, semi-permanent or temporary pivotal connection between the structural frame members of the adjoining sections of the articulating vehicle.

As shown in FIGS. 9 and 10, a large mining wheel loader is generally designated by the numeral 200. The large mining wheel loader 200 generally includes a large mining device such as bucket 202 that is pivotally joined to tilt extension 212A by wishbone link 210A and to tilt extension 212B by wishbone link 210B. While the wishbone link 210A, 210B is shown in a large mining wheel loader 200, such wishbone links 210A, 210B are employed in other heavy duty vehicles. Typically, the wishbone link 210A, 210B employs a bearing, for example a spherical plain bearing, received within the structural frame members. The wishbone links 210A, 210B may provide a permanent, semi-permanent, or temporary pivotal connection between the bucket 202 and booms 204A, 204B of the loader 200.

The wishbone links 210A, 210B allow the bucket 202 to pivot in order to dump and scoop loose material. Traditionally, this cycle of dumping and scooping consists of three main phases. First, the operator places the bucket 202 on the ground, with its leading edge flush with or at a desired distance from the ground. The wheels 205 of the loader 200 advance the bucket 202, in addition to the loader 200, until the bucket 202 penetrates the material. In some cases this first phase is more difficult due to the properties of the material and/or lack of traction between the wheels 205 and ground. In this scenario, the operator may choose to repeatedly actuate the loader bucket tilt cylinders 208A, 208B as the loader 200 moves the bucket 202 further into the pile of material. Once a desired amount of material is contained in the bucket 202 the loader bucket lift cylinders 206A, 206B (not depicted) actuate to lift the bucket 202 to a desired height. The operator may then activate the wheels 205 to position the bucket 202 as needed. Lastly, the loader bucket tilt cylinders 208A, 208B activate to tilt the bucket 202 so that the material contained therein empties from the bucket 202. At this point the three phases can be repeated. Loaders 200 of the type disclosed herein are subjected to repeated series of these phases and the operator can engage the loader bucket lift cylinders 206A, 206B and the loader bucket tilt cylinders 208A, 208B in a number of different ways depending on the application. This movement places the bearings connecting the wishbone link 210A, 210B to the bucket 202 under considerable repeated stresses in an environment often filled with particulates that can contaminate the bearings.

Bearings, particularly spherical plain bearings, are necessary to reduce friction between moving parts of a mechanical assembly such as the structural frame members of the adjoining sections of the articulating vehicle or between the bucket and booms of a large mining wheel loader. Spherical bearing assemblies traditionally include an inner member positioned for rotational movement in relation to an outer member. The inner member typically includes a ball having a spherical outer diameter that defines an outer engagement surface and, typically, a bore passes through the ball. A shaft extends through the bore to pivotally secure the inner member to a portion of the structural frame or clevis. The outer member typically includes an outer ring having a spherical inner diameter that defines an inner engagement surface contoured to receive and retain the inner member therein. A lubricant gel, paste, or liquid such as grease, is typically provided between the inner member and the outer member; and between the inner member and the shaft, to reduce friction therebetween. Periodically the lubricant is replenished with a lubricant supply system. The replenishment of the lubricant helps flush debris out from between the inner member and the outer member. Spherical plain bearings used in the articulated joint of articulating vehicles and in the devises on buckets for large mining wheel loaders are subjected to small angle and high frequency oscillations. These conditions are not conducive for providing and replenishing lubrication to separate the sliding contacting surfaces of a spherical plain bearing and results in damage to such sliding contacting surfaces.

Seals extending between the inner member and the outer member and/or between the inner member and the shaft have been employed to retain the lubricant and to mitigate the influx of debris between the outer member and the inner member and between the inner member and the shaft. For example, a single SpreadLock® type seal is positioned in each single groove positioned on opposing sides of a spherical bearing, as described in U.S. Pat. No. 6,626,575, the subject matter of which is incorporated herein by reference.

Typically, a single groove on each of opposing sides of the spherical bearing was employed to minimize the axial dimensions of the bearing while maximizing the load bearing capability of and sliding engagement between, the outer surface of the ball and the inner surface of the outer ring. However, space in the articulated joint can limit the type of seals that can be employed. For example, some articulated joints have two coaxially aligned bearings located in devises that have relatively tight clearances and limited space. Moreover, some seals do not keep all contaminants out of the bearing and can impair motion of the inner member relative to the outer member. In addition, movement of the inner member relative to the outer member can cause the seal to become dislodged. A means of preventing contaminant entry that would not impair relative motion of the inner member and the outer member, would better keep contaminants out of the bearing and would not allow the seal to be dislodged has long been sought in the industry.

SUMMARY OF THE INVENTION

In one embodiment, a bearing and seal arrangement is in an articulated joint. The bearing and seal arrangement includes a first spherical bearing having a first outer ring surrounding a first inner member. The first outer ring has a first spherical interior bearing surface and the first inner member has a first spherical exterior surface. A first lubricious liner is between the first outer ring and the first inner member. The bearing and seal arrangement also includes a first seal receiving area with an axially extending first width. The bearing and seal arrangement also includes a second spherical bearing having a second outer ring surrounding a second inner member. The second outer ring has a second spherical interior bearing surface and the second inner member has a second spherical exterior surface. A second lubricious liner is between the second outer ring and the second inner member. The bearing and seal arrangement also includes a second seal receiving area having an axially extending second width that is greater than the first width. The first spherical bearing and the second spherical bearing are coaxially aligned with one another. A flexible double lipped annular seal and a scraper seal are positioned in the first seal receiving area, extending between the first outer ring and the first inner member. The scraper seal is positioned axially outward from the flexible double lipped annular seal. A boot seal is positioned in the second seal receiving area, extending between the second outer ring and the second inner member.

In one embodiment, the boot seal has a low friction liner in sliding engagement with a portion of the second inner member.

In one embodiment, the second inner member has a circumferential groove and the low friction liner is slidingly seated in the groove.

In one embodiment, the first inner member has a first cylindrical interior surface defining a first bore. The second inner member has a second cylindrical interior surface defining a second bore. An annular shaft seal is positioned in a recess formed in the first cylindrical interior surface and/or the second cylindrical interior surface.

In one embodiment, the annular shaft seal has a C-shaped cross section with an anchor leg and a sealing leg connected to one another by a flexible bend.

In one embodiment, the anchor leg and the sealing leg are spaced apart from one another by a gap.

In one embodiment, the bearing and seal arrangement has a third lubricious liner engaging the first cylindrical interior surface and/or a fourth lubricious liner engaging the second cylindrical interior surface.

In one embodiment, the first lubricious liner and/or the second lubricious liner is made from polytetrafluoroethylene.

In one embodiment, the first outer ring and/or the second outer ring have at least two axially extending fractures.

In one embodiment, an articulated joint includes a first structure having a first support arm terminating in a first clevis. The first clevis has a first flange and a second flange spaced apart from one another by a first gap with a first length. A second support arm terminates in a second clevis. The second clevis has a third flange and a fourth flange spaced apart from one another by a second gap with a second length. The second length is longer than the first length. The articulated joint also includes a second structure having a fifth flange extending from a third support arm and a sixth flange extending from a fourth support arm. The fifth flange is positioned between and pivotally connected to the first flange and the second flange of the first clevis. The sixth flange is positioned between and pivotally connected to the third flange and the fourth flange of the second clevis. A first spherical bearing moveably connects the first clevis to the fifth flange. The first spherical bearing includes a first outer ring surrounding a first inner member. The first outer ring has a first spherical interior bearing surface and the first inner member has a first spherical exterior surface. A first lubricious liner is between the first outer ring and the first inner member. The first spherical bearing also includes a first seal receiving area with an axially extending first width. A second spherical bearing moveably connects the second clevis to the sixth flange. The second spherical bearing includes a second outer ring surrounding a second inner member. The second outer ring has a second spherical interior bearing surface and the second inner member has a second spherical exterior surface. A second lubricious liner is between the second outer ring and the second inner member. The second spherical bearing includes a second seal receiving area with an axially extending second width that is greater than the first width. The first spherical bearing and the second spherical bearing are coaxially aligned with one another. The first seal receiving area has a flexible double lipped annular seal and a scraper seal extending between the first outer ring and the first inner member. The scraper seal is positioned axially outward from the flexible double lipped annular seal. The second seal receiving area has a boot seal extending between the second outer ring and the second inner member.

In one embodiment, the boot seal has a low friction liner in sliding engagement with a portion of the second inner member.

In one embodiment, the second inner member has a circumferential groove and the low friction liner is slidingly seated in the groove.

In one embodiment, the inner member has a first cylindrical interior surface defining a first bore. The second member has a second cylindrical interior surface defining a second bore. An annular shaft seal is positioned in a recess formed in first cylindrical interior surface and/or the second cylindrical interior surface.

In one embodiment, the annular shaft seal has a C-shaped cross section with an anchor leg and a sealing leg connected to one another by a flexible bend.

In one embodiment, the anchor leg and the sealing leg are spaced apart from one another by a gap.

In one embodiment, the articulated joint also includes a third lubricious liner engaging the first cylindrical interior surface and/or a fourth lubricious liner engaging the second cylindrical interior surface.

In one embodiment, the first lubricious liner and/or the second lubricious liner is made from polytetrafluoroethylene.

In one embodiment, the first outer ring and the second outer ring have at least two axially extending fractures.

In one embodiment, the first support arm is vertically above the second support arm.

In one embodiment, a bearing and seal arrangement for a wishbone joint on a loader includes a spherical bearing having an outer ring surrounding an inner member. The outer ring has a spherical interior bearing surface and the inner member has a spherical exterior surface. A lubricious liner is between the outer ring and the inner member. The spherical bearing also includes a seal receiving area with an axially extending width. The seal receiving area has a flexible double lipped annular seal and a scraper seal extending between the outer ring and the inner member. The scraper seal is positioned axially outward from the flexible double lipped annular seal.

In one embodiment, one or more spherical bearings are coaxially aligned with one another.

In one embodiment, the inner member has a cylindrical interior surface defining a bore and an annular shaft seal is positioned in a recess formed in the cylindrical interior surface.

In one embodiment, the lubricious liner is made from polytetrafluoroethylene.

In one embodiment, the outer ring includes two axially extending fractures that define a junction between a first outer ring segment and a second outer ring segment.

In one embodiment, the second seal receiving area has a boot seal extending between the second outer ring and the second inner member.

In one embodiment, the boot seal has a low friction liner in sliding engagement with a portion of the second inner member.

In one embodiment, the inner member has a circumferential groove and the low friction liner is slidingly seated in the groove.

In one embodiment, the annular shaft seal has a C-shaped cross section including an anchor leg and a sealing leg connected to one another by a flexible bend.

In one embodiment, the anchor leg and the sealing leg are spaced apart from one another by a gap.

In one embodiment, a retaining ring having an L-shaped cross section is embedded in the annular shaft seal.

DETAILED DESCRIPTION

Figure 1:
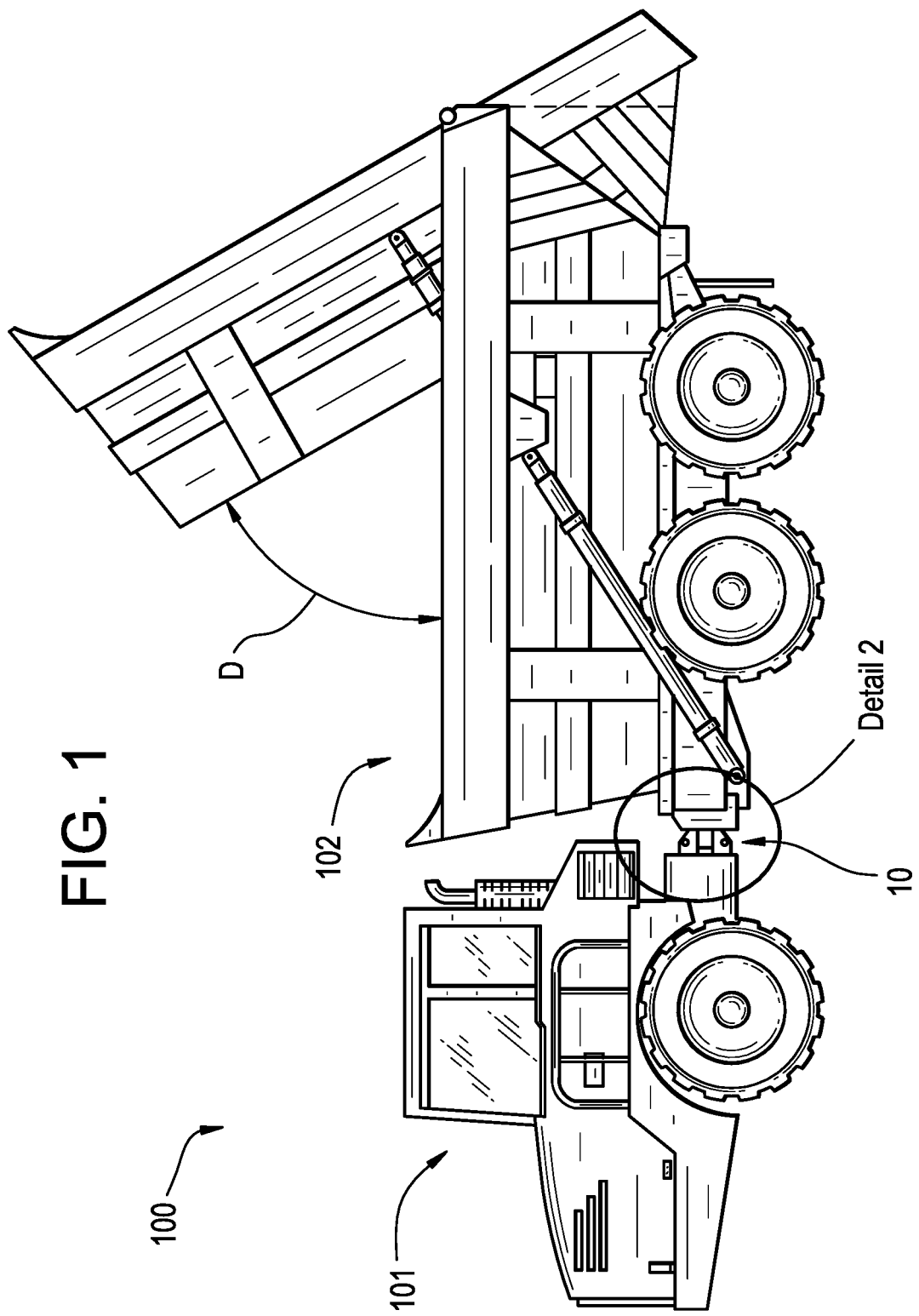
FIG. 1 is a side view sketch of an articulating dump truck.
Figure 2:
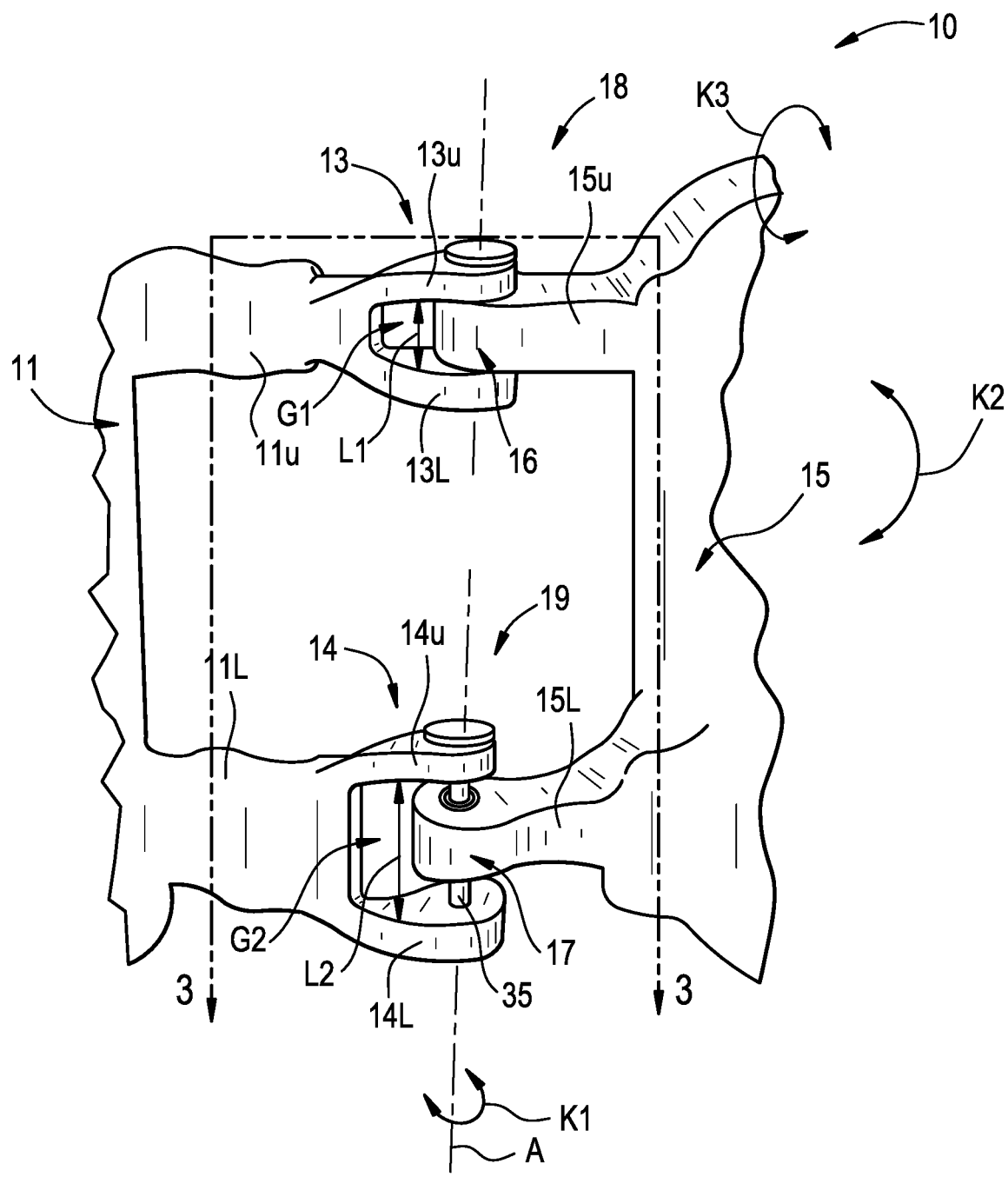
FIG. 2 is an enlarged perspective view of the articulated joint of the articulating dump truck of FIG. 1.

As shown in FIG. 2 an articulated joint for an articulated haul truck (e.g., a dump truck, a tractor trailer, a tandem bus, a scraper, or the like) is generally designated by the numeral 10. The articulated joint 10 is of a double joint configuration having a first articulated joint 18 and a second articulated joint 19 that are pivotable about a common central axis A, for example, rotatable about the central axis A, as shown by the arrow K1. The first articulated joint 18 and the second articulated joint 19 pivotally attach a cab structure 11 of an articulated truck to a trailer structure 15 of the articulated truck. The first articulated joint 18 and the second articulated joint 19 also allow for twisting or angular misalignment between the cab structure 11 and trailer structure 15 as indicated, for example, by the arrows K2 and K3.

As shown in FIG. 2, the cab structure 11 has two generally parallel support arms, for example, a first support arm 11U (e.g., an upper support arm) and a second support arm 11L (e.g., a lower support arm). The first support arm 11U terminates in a first clevis 13 and the second support arm 11L terminates in a second clevis 14. The first support arm 11U is positioned vertically above the second support arm 11L. However, the present invention is not limited in this regard as the second support arm 11L may be positioned above the first support arm 11U or the first support arm 11U and the second support arm 11L may be positioned side by side in a horizontal plane or any angularly offset plane, without departing from the broader aspects of the present invention.

As shown in FIG. 2, the first clevis 13 has a first flange 13U (e.g., an upper flange) and a second flange 13L (e.g., a lower flange) that are generally parallel to and spaced apart from one another by a first gap G1 that has a first length L1. The second clevis 14 has a third flange 14U (e.g., an upper flange) and a fourth flange 14L (e.g., a lower flange) that are generally parallel to and spaced apart from one another by a second gap G2 having a second length L2, that is greater in magnitude than the first length L1. For example, L2 is about 120% of L1. In one embodiment, L2 is 115% to 125% of L1. Thus, the first clevis 13 has less space available for accepting a bearing, than the second clevis 14, as described herein.

As shown in FIG. 2, the trailer structure 15 has two generally parallel support arms, for example, a third support arm 15U (e.g., an upper arm) and a fourth support arm 15L (e.g., lower support arm) that is positioned below the third support arm 15U. The third support arm 15U has a fifth flange 16 extending therefrom; and the fourth support arm 15L has a sixth flange 17 extending therefrom. The fifth flange 16 is positioned generally between the first flange 13U and the second flange 13L of the first clevis 13 and is pivotally connected thereto as described herein. The sixth flange 17 is positioned generally between the third flange 14U and the fourth flange 14L of the second clevis 14 and is pivotally connected thereto as described herein.

Figure 3:
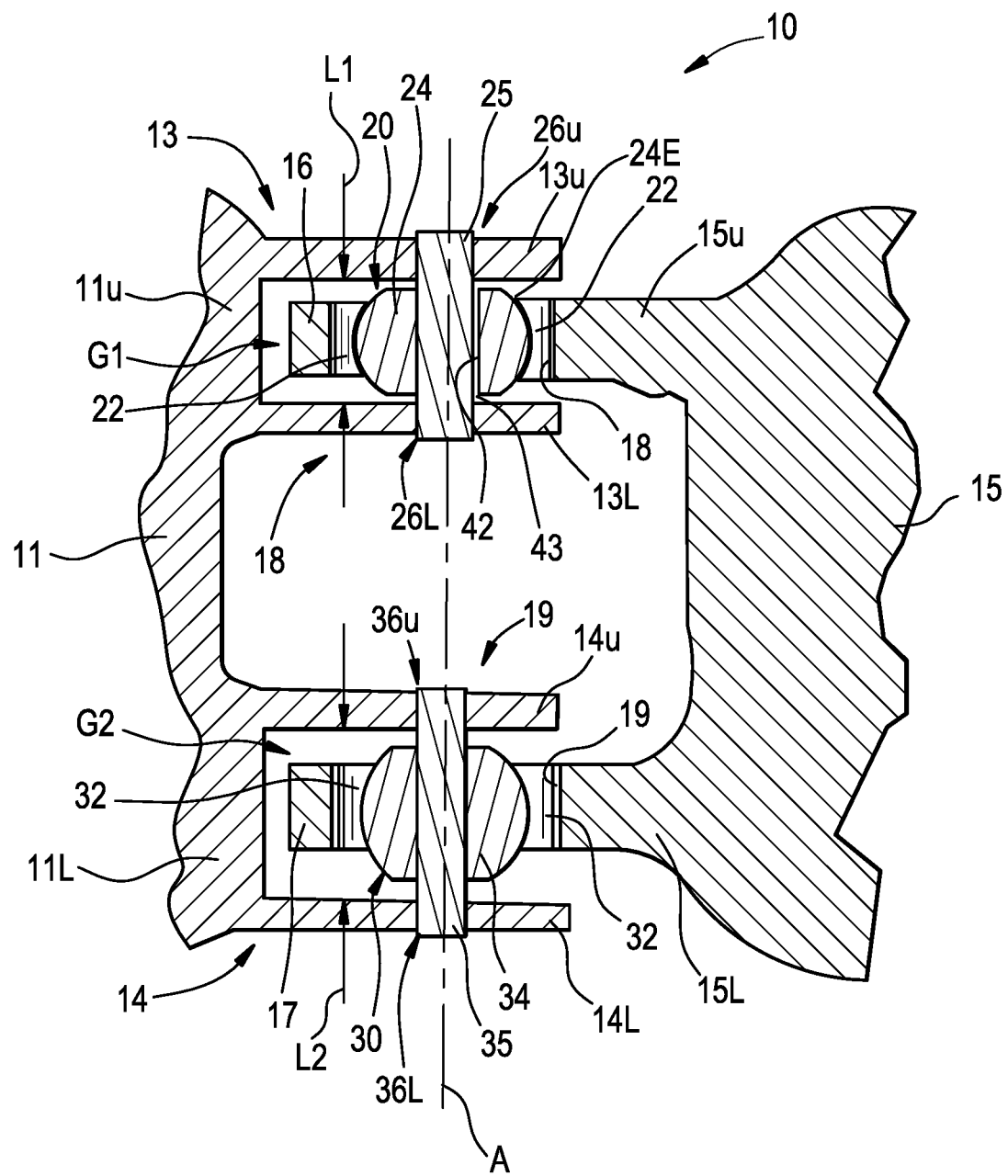
FIG. 3 is a cross sectional view of the articulated joint of FIG. 2, taken across section 3-3.

As shown in FIG. 3, the articulated joint 10 includes a bearing and seal arrangement that includes a first spherical bearing 20 disposed in the fifth flange 16 and pivotally and rotationally mounted to the first clevis 13 via a first shaft 25. The first shaft 25 is secured (e.g. press fit, interference fit, secured with mechanical fasteners, adhered to, welded to brazed to or otherwise) into bores 26U and 26L extending through the first flange 13U and the second flange 13L, respectively. The bearing and seal arrangement of the articulated joint 10 includes a second spherical bearing 30 disposed in the sixth flange 17 and pivotally and rotationally mounted to the second clevis 14 via a shaft 35. The shaft 35 is secured (e.g. press fit, interference fit, secured with mechanical fasteners, adhered to, welded to brazed to or otherwise) into bores 36U and 36L extending through the third flange 14U and the fourth flange 13L, respectively.

Figure 4A:
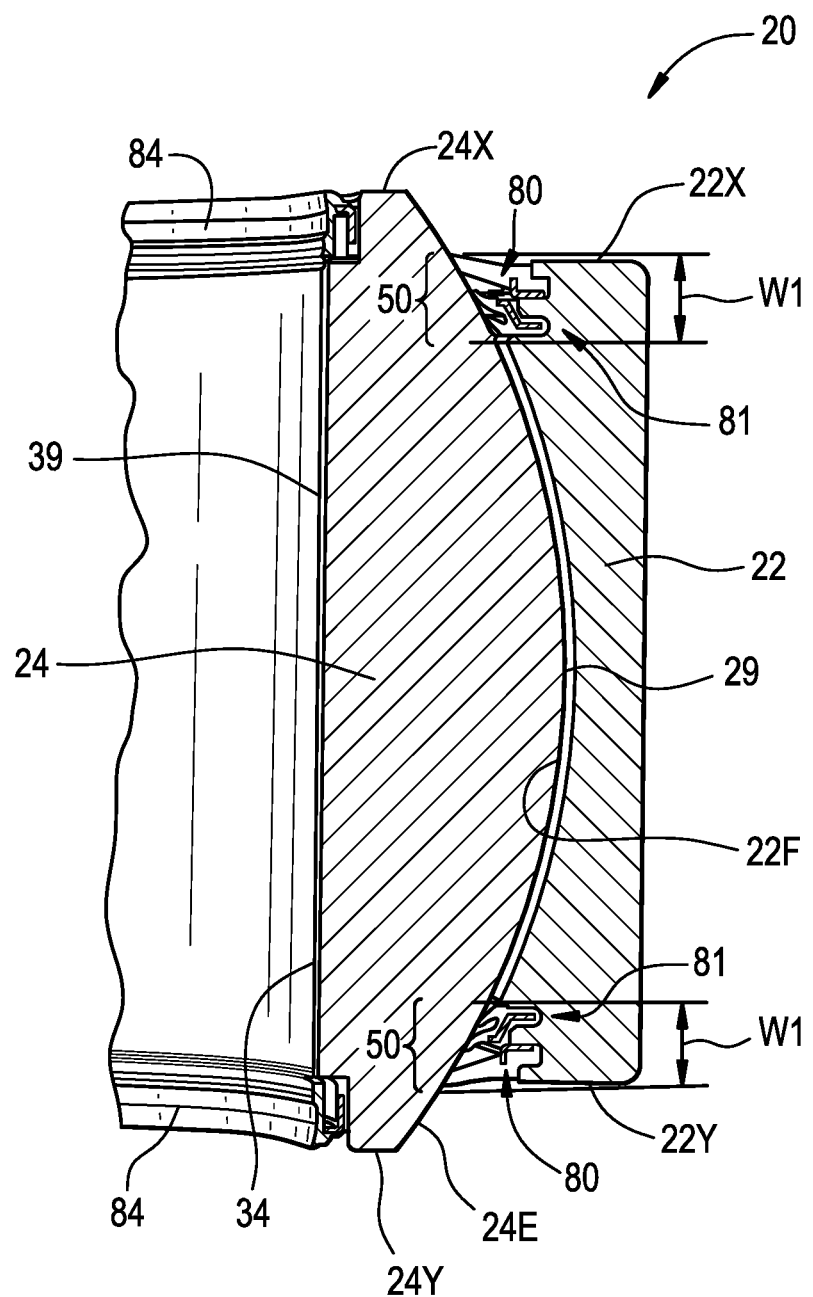
FIG. 4A is an enlarged cross sectional view of the bearing located in an upper portion of the articulated joint of FIG. 3.
Figure 4B:
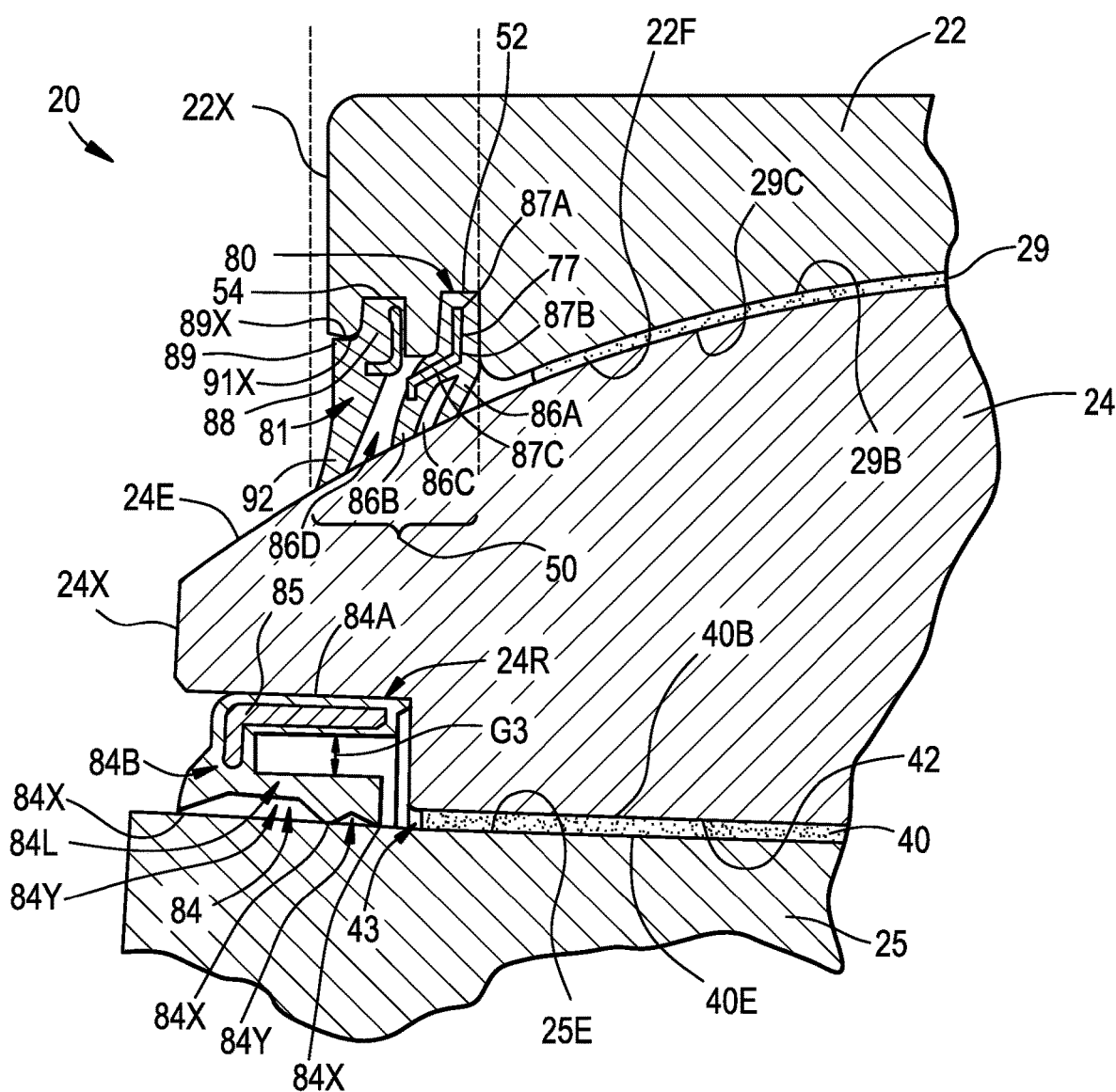
FIG. 4B is a further enlarged view of FIG. 4A rotated 90 degrees and showing additional detail of the seals.
Figure 5:
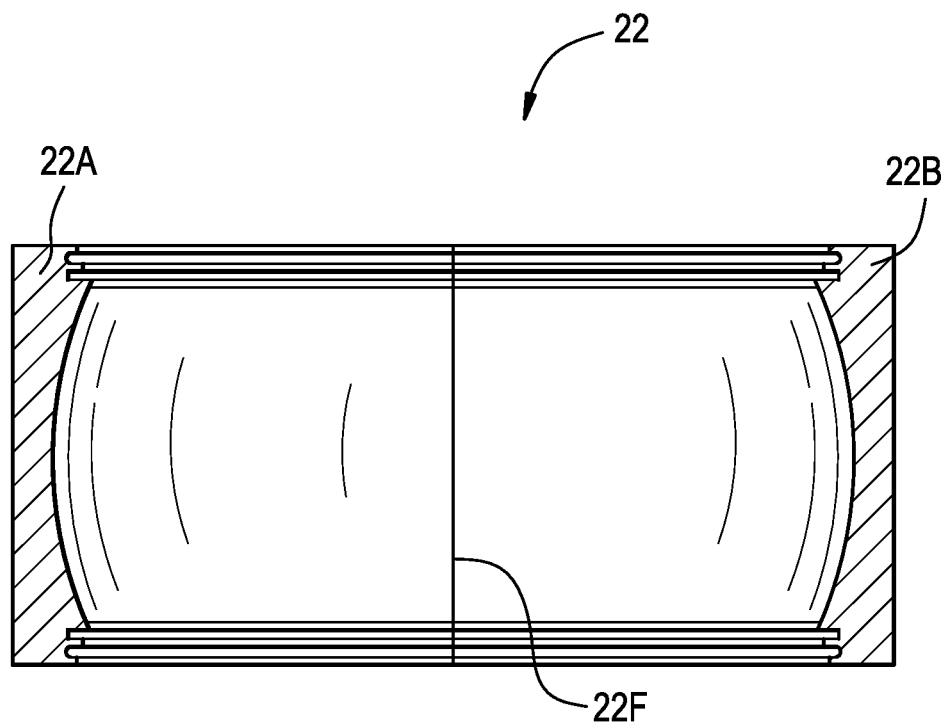
FIG. 5 is a cross sectional view of outer ring of the bearing of FIG. 4.

As shown in FIGS. 3, 4A and 4B, the first spherical bearing 20 includes a first outer ring 22 that surrounds a first inner member 24 (e.g., a truncated spherical ball). As shown in FIG. 5, the first outer ring 22 is a two piece split ring that has a fracture 22F that defines a juncture between a first outer ring segment 22A and a second outer ring segment 22B. The first outer ring segment 22A and the second outer ring segment 22B are fitted around the first inner member 24 and abutted at the fracture 22F. The first outer ring 22 has a first spherical interior bearing surface 22F.

As best shown in FIG. 4B, the first inner member 24 has a first spherical exterior surface 24E and the first outer ring 22 has a first interior spherical surface 22F. A first lubricious liner 29 is disposed between the first outer ring 22 and the first inner member 24. A base surface 29B of the first lubricious liner 29 is adhered or bonded to the first interior spherical surface 22F of the first outer ring 22, for example via an adhesive (e.g., phenolic resin or epoxy). A bearing surface 29C of the first lubricious liner 29 slidingly engages the first spherical exterior surface 24E and the first outer ring 22. While the base surface 29B of the first lubricious liner 29 is shown and described as being adhered or bonded to the first interior spherical surface 22F and the bearing surface 29C of the first lubricious liner 29 is shown and described as slidingly engaging the first spherical exterior surface 24E, the present invention is not limited in this regard as other configurations may be employed including but not limited to the first lubricious liner 29 being adhered or bonded to the spherical exterior surface 24E of the first inner member 24.

Figure 6A:
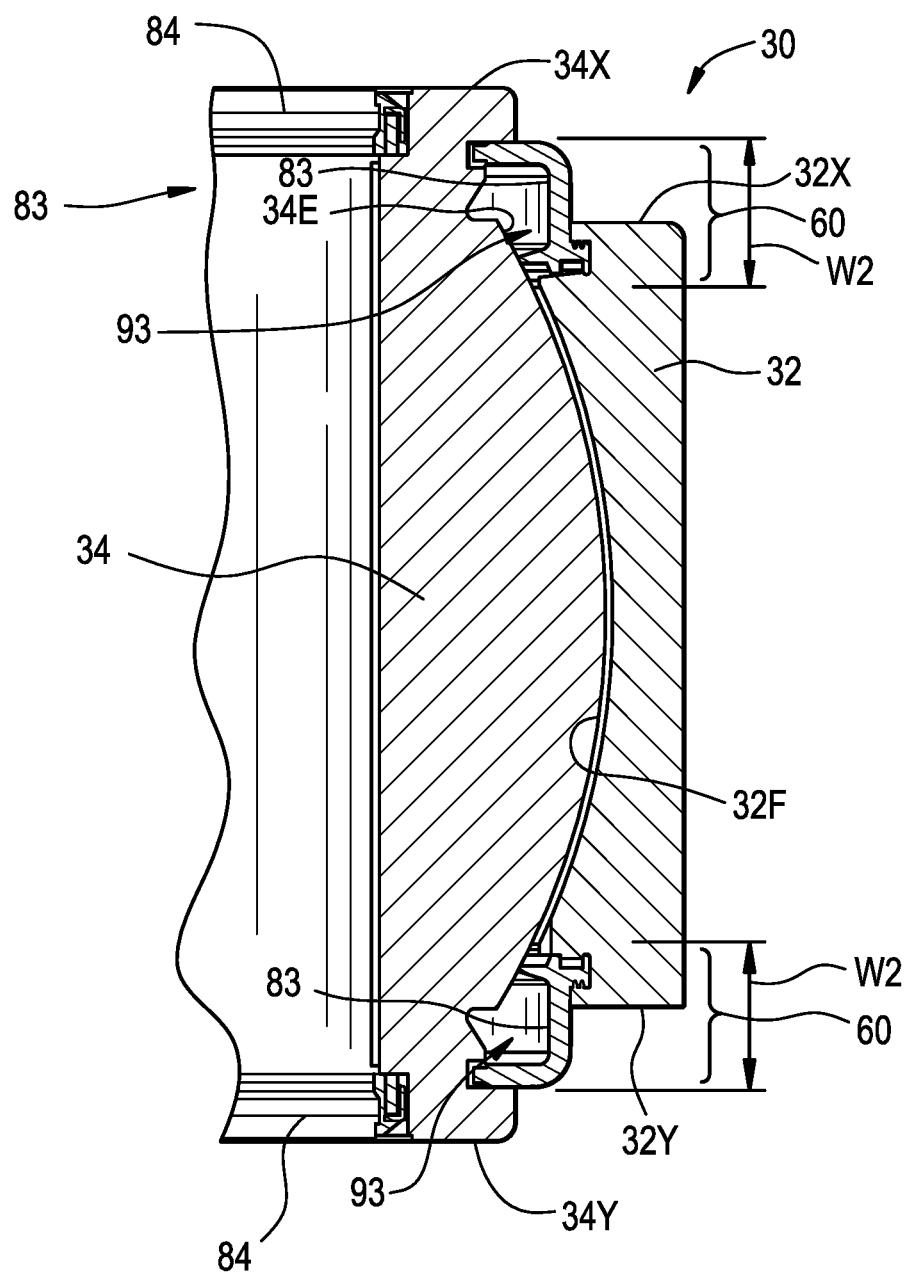
FIG. 6A is an enlarged cross sectional view of the bearing located in a lower portion of the articulated joint of FIG. 3.
Figure 6B:
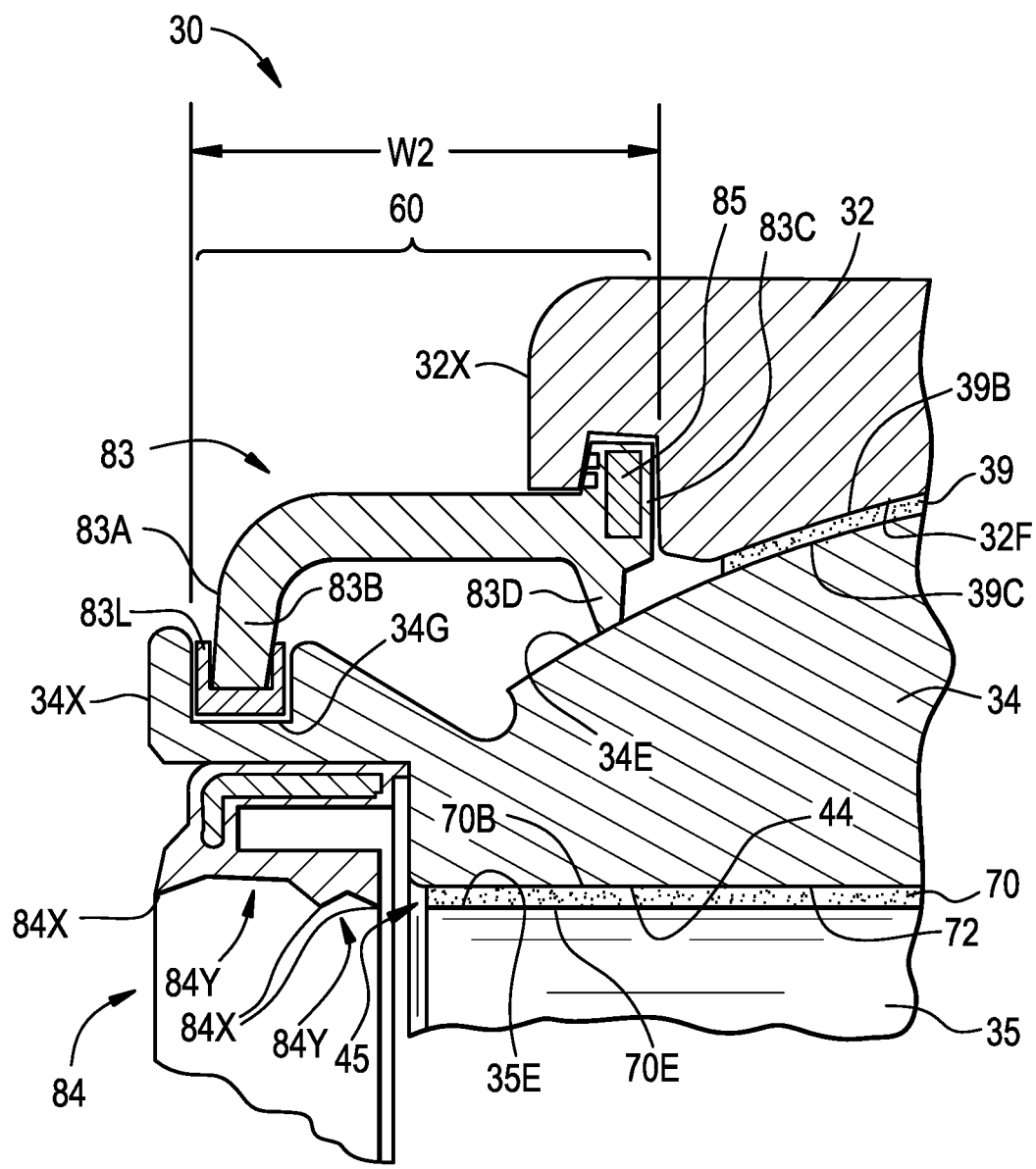
FIG. 6B is a further enlarged view of FIG. 6A rotated 90 degrees and showing additional detail of the seals.
Figure 7:
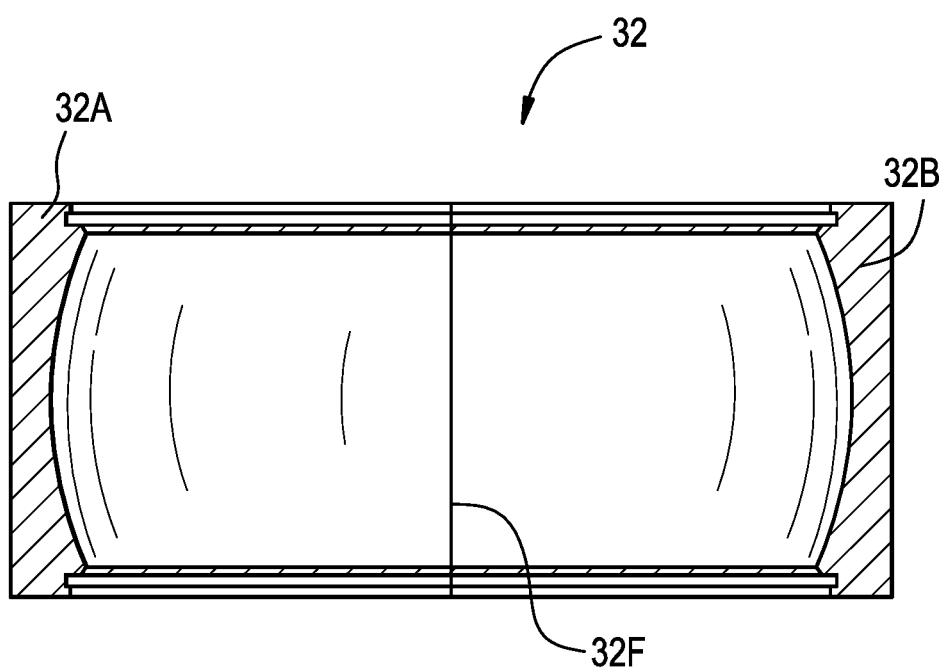
FIG. 7 is a cross sectional view of outer ring of the bearing of FIG. 4.

As shown in FIGS. 3, 6A and 6B, the second spherical bearing 30 includes a second outer ring 32 that surrounds a second inner member 34 (e.g., a truncated spherical ball). As shown in FIG. 7, the second outer ring 32 is a two piece split ring that has a fracture 32F that defines a juncture between a third outer ring segment 32A and a fourth outer ring segment 32B. The second outer ring segment 32A and the fourth outer ring segment 32B are fitted around the second inner member 34 and abutted at the fracture 32F. The second outer ring 32 has a second spherical interior bearing surface 32F.

As best shown in FIG. 6B, the second inner member 34 has a second spherical exterior surface 34E and the outer ring 32 has a second interior spherical surface 32F. A second lubricious liner 39 is disposed between the second outer ring 32 and the second inner member 34. A base surface 39B of the second lubricious liner 39 is adhered or bonded to the second interior spherical surface 32F of the second outer ring 32, for example via an adhesive (e.g., phenolic resin or epoxy). A bearing surface 39C of the second lubricious liner 39 slidingly engages the second spherical exterior surface 34E and the second outer ring 32. While the base surface 39B of the second lubricious liner 39 is shown and described as being adhered or bonded to the second interior spherical surface 32F and the bearing surface 39C of the second lubricious liner 39 is shown and described as slidingly engaging the first spherical exterior surface 34E, the present invention is not limited in this regard as other configurations may be employed including but not limited to the first lubricious liner 39 being adhered or bonded to the spherical exterior surface 34E of the second inner member 34.

As shown in FIG. 3, the first spherical bearing 20 and the second spherical bearing 30 are aligned coaxially with one another along the central axis A.

As shown in FIGS. 4A and 4B, the first spherical bearing 20 has a first seal receiving area 50 located proximate opposing axial ends 22X and 22Y of the first outer ring 22 and axially inward from opposing axial ends 24X and 24Y of the first inner member 24. The first seal receiving areas 50 have an axially extending first width W1. In one embodiment, both of the axial extending first widths W1 are of the same or approximately the same magnitude. In one embodiment, the axial extending first widths W1 are of different magnitudes.

As shown in FIGS. 4A and 4B, each of the first seal receiving areas 50 have a flexible double lipped annular seal 80 and a scraper seal 81 positioned therein and extending between the first outer ring 22 and the first inner member 24. The scraper seal 81 is positioned axially outward from the flexible double lipped annular seal 80. In one embodiment, the double lipped annular seal 80 and a scraper seal 81 are configured as described in Applicant's copending U.S. patent application Ser. No. 15/634,186, entitled "Multistage Seal for Bearing Assembly," filed Jun. 27, 2017, the subject matter of which is incorporated herein in its entirety. Each of the first seal receiving areas 50 defines a first annular groove 52 and a second annular groove 54. In one embodiment, the first annular groove 52 is substantially concentric with the second annular groove 54. The second annular grooves 54 are formed in the first seal receiving area 50, axially outward of the first annular groove 52. In one embodiment, the first annular groove 52 and the second annular groove 54 each define a cross section having a substantially U-shaped geometry.

While the first seal receiving area 50 has been shown and described as defining a first annular groove 52 and a second annular groove 54, the present invention is not limited in this regard as the outer race can define less (e.g., one) or more (e.g., three or more) than a first annular groove 52 and a second annular groove 54 without departing from the broader aspects of the invention. While the first annular groove 52 and the second annular groove 54 have been shown and described as defining cross sections having a substantially U-shaped geometry, the present invention is not limited in this regard as the first annular groove 52 and the second annular groove 54 can define respective annular grooves having a variety of geometric configurations, and in particular any geometric configuration corresponding to an annular seal or ring configuration, without departing from the broader aspects of the invention. In addition, the first annular groove 52 and the second annular groove 54 can define respective annular grooves having the different geometric configuration.

As shown in FIGS. 4A and 4B, the bearing assembly 10 includes a two stage seal assembly positioned in each of the first seal receiving areas 50. In particular, the first annular groove 52 has a flexible double lipped annular seal 80 seated therein and the second annular groove 54 has a scraper seal 81 seated therein. The scraper seals 81 and the flexible double lipped annular seals 80 each extend between the first outer ring 22 and the first inner member 24. The scraper seals 81 (e.g., external seals) are seated axially outward from the respective one of the flexible double lipped annular seals 80 (e.g., internal seals).

A flexible double lipped annular seal 80 is seated in each of the first annular grooves 52. The first lip seal 86A and the second lip seal 86B define a gap 86C therebetween. In one embodiment, the gap 86C is filled with a lubricant (e.g., grease) and/or a sealant material.

As best shown in FIG. 4B, the flexible double lipped annular seal 80 includes a metallic shield 77 having a radially extending second base 87A and a mid-section 87C extending axially outward and radially inward from the second base 87A at a first bend 87B.

The metallic shield 77 provides a stiffening feature to the flexible double lipped annular seal 80 to assist in securing the flexible double lipped annular seal 80 in the first annular groove 52 by providing a radially outward acting biasing force that urges the first anchor segment 33 of the flexible double lipped annular seal 80 into the first annular groove 52.

As shown in FIGS. 4A and 4B a second gap 86D is located between the flexible double lipped annular seal 80 and the scraper seal 81. In one embodiment, the second gap 86D is filled with a lubricant and/or a sealant material. While FIGS. 4A and 4B show both the first annular groove 52 and the second annular groove 54; and the flexible double lipped annular seal 80 as well as the scraper seal 81, the present invention is not limited in this regard as the bearing assembly 10 may only employ the first annular grooves 52 with the flexible double lipped annular seals 80, as illustrated in FIG. 4B.

As shown in FIGS. 4A and 4B, a scraper seal 81 is seated in each of the second annular grooves 54. In one embodiment, the scraper seals 81 are more rigid, stiffer and harder than a first lip seal 86A and a second lip seal 86B portions of the flexible double lipped annular seals 80, as described herein. In one embodiment, the first lip seal 86A and the second lip seal 86B portions of the flexible double lipped annular seal 80 are manufactured from natural rubber, synthetic rubber, soft plastic, felt, PTFE, silicones, or other synthetic elastomer materials such as, for example, nitrile, urethane, polyurethane, and the like. The scraper seals 81 are manufactured from a metallic material, plastic such as a thermoplastic material, or a higher durometer elastomer.

As best shown in FIG. 4B, the scraper seal 81 includes an anchor segment 88 that has a shape complementary to the second annular groove 54. A stabilizing block 89 extends axially away from the anchor segment 88 and is arranged to form a shoulder 89X with the second anchor segment 88. The shoulder 89X seats on a radially inward facing abutment surface 91X of the first outer ring 22. A seal leg 92 extends from the stabilizing block 89.

Applicant has surprisingly discovered that use of the paired combination of the double lipped annular seal 80 and the scraper seal 81 provides suitable sealing to prevent debris from contaminating (e.g., increasing friction and/or damaging) the first lubricious liner 29 while having a small enough axial width to fit in the narrow axially extending first width W1 of the first seal receiving areas 50 caused by the tight clearances in the first clevis 13 caused by the small first gap G1.

As shown in FIGS. 6A and 6B, the second spherical bearing 30 has a second seal receiving area 60 located proximate opposing axial ends 32X and 32Y of the second outer ring 32 and axially inward from opposing axial ends 34X and 34Y of the second inner member 34. The second seal receiving areas 60 have an axially extending second width W2. The axial extending second widths W2 are greater than the axial extending first widths. In one embodiment, both of the axial extending second widths W2 are of the same or approximately the same magnitude. In one embodiment, the axial extending widths W2 are of different magnitudes.

As shown in FIGS. 6A and 6B, each of the second seal receiving areas 60 have a boot seal 83 positioned therein and extending between the second outer ring 32 and the second inner member 34. In one embodiment, the boot seal 83 is configured as described in Applicant's copending U.S. patent application Ser. No. 14/967,541, entitled "Spherical Bearing with Annular Seal Having An Auxiliary Seal Leg Extending Therefrom," filed Dec. 14, 2015. The boot seal 83 prevents debris from entering the cavity 93 between the second inner ring 34 and the second outer ring 32. In one embodiment, the boot seal 83 has a low friction liner 83L (e.g., a liner having a C-shaped cross section with a radially outward facing opening) positioned thereon. Referring to FIG. 6B, the low friction liner 83L is in sliding engagement with (e.g., slidingly seated) a portion of the second inner member 34 at a first end 83A, such as an annular groove 34G formed therein. The second end 83C of the boot seal 83 includes a flat washer shaped (e.g., rectilinear cross section) retaining ring 85 therein. An annular second boot leg 83D extends from the second end 83C of the boot seal 83 to radially support the boot seal 83 on the second inner member 34. In one embodiment, the low friction liner 83L is configured as described in Applicant's issued U.S. Pat. No. 8,783,953 B2. The low friction liner 83L is secured to a first boot leg 83B at the first end 83A. The low friction liner 83L is secured to the first boot leg 83B by a suitable adhesive. In the illustrated embodiment, the low friction liner 83L is annular with a U-shaped cross section. In one embodiment, the liner is manufactured from low friction and/or wear resistant material such as polytetrafluoroethylene (PTFE). While the low friction liner 83L is described as being secured to the first boot leg 83B by a suitable adhesive, the present invention is not limited in this regard as the liner or other low friction and/or wear resistant material can be disposed on the head, including but not limited to, by application of a coating and or use of mechanical fasteners. The head and the liner may be of any suitable cross-section, including but not limited to triangular, elliptical and tee-shaped cross sections, without departing from the broader aspects disclosed herein.

Applicant has surprisingly discovered that the larger magnitude of the axially extending second width W2 of the second seal receiving area 60 created by the larger second gap G2 in the second clevis 14, allows the wider boot seal 83 to be employed. The use of the boot seal 83 along with the low friction liner 83L liner prevents debris from contaminating (e.g., increasing friction and/or damaging) the second lubricious liner 39 while providing low friction resistance to angular misalignments of the outer ring 32 relative to the inner member 34.

Referring back to FIGS. 3, 4A and 4B, the first inner member 24 has a first cylindrical interior surface 42 defining a first bore 43 extending therethrough. The first inner member 24 is rotatingly mounted on the first shaft 25. In one embodiment, as best shown in FIG. 4B, a base surface 40B of a third lubricious liner 40 is adhered to the first cylindrical interior surface 42. A bearing surface 40E slidingly engages a cylindrical exterior surface 25E of the first shaft 25. In one embodiment, the third lubricious liner 40 floats freely between the first cylindrical interior surface 42 and the cylindrical exterior surface 25E of the first shaft 25.

Referring to FIGS. 3, 6A and 6B, the second inner member 34 has a second cylindrical interior surface 44 defining a second bore 45 extending therethrough. The second inner member 34 is rotatingly mounted on the second shaft 35. In one embodiment, as best shown in FIG. 6B, a base surface 70B of a fourth lubricious liner 70 is adhered to the second cylindrical interior surface 44. A bearing surface 70E slidingly engages a cylindrical exterior surface 35E of the first shaft 35. In one embodiment, the fourth lubricious liner 70 floats freely between the second cylindrical interior surface 44 and the cylindrical exterior surface 35E of the second shaft 35.

As shown in FIGS. 4A, 4B, 6A, and 6B, an annular shaft seal 84 is positioned in a recess 24R formed in the first cylindrical interior surface 42 of the inner member 24. The annular shaft seal 84 has a C-shaped cross section, defined by an anchor leg 84A and a sealing leg 84L connected to one another by a flexible bend 84B. The anchor leg 84A and the sealing leg 84L are spaced apart from one another by a gap G3 therebetween. The gap G3 allows the sealing leg 84L to cantilever and pivot at the flexible bend 84B to form a positive engagement with the shaft 25 to provide a greater interference is between the sealing leg 84L and the cylindrical exterior surface 25E of the shaft 25. Having a gap G3 in the annular shaft seal 84 allows for a larger interference without increasing pressure, as the sealing leg 84L has space to deflect into.

Figure 12:
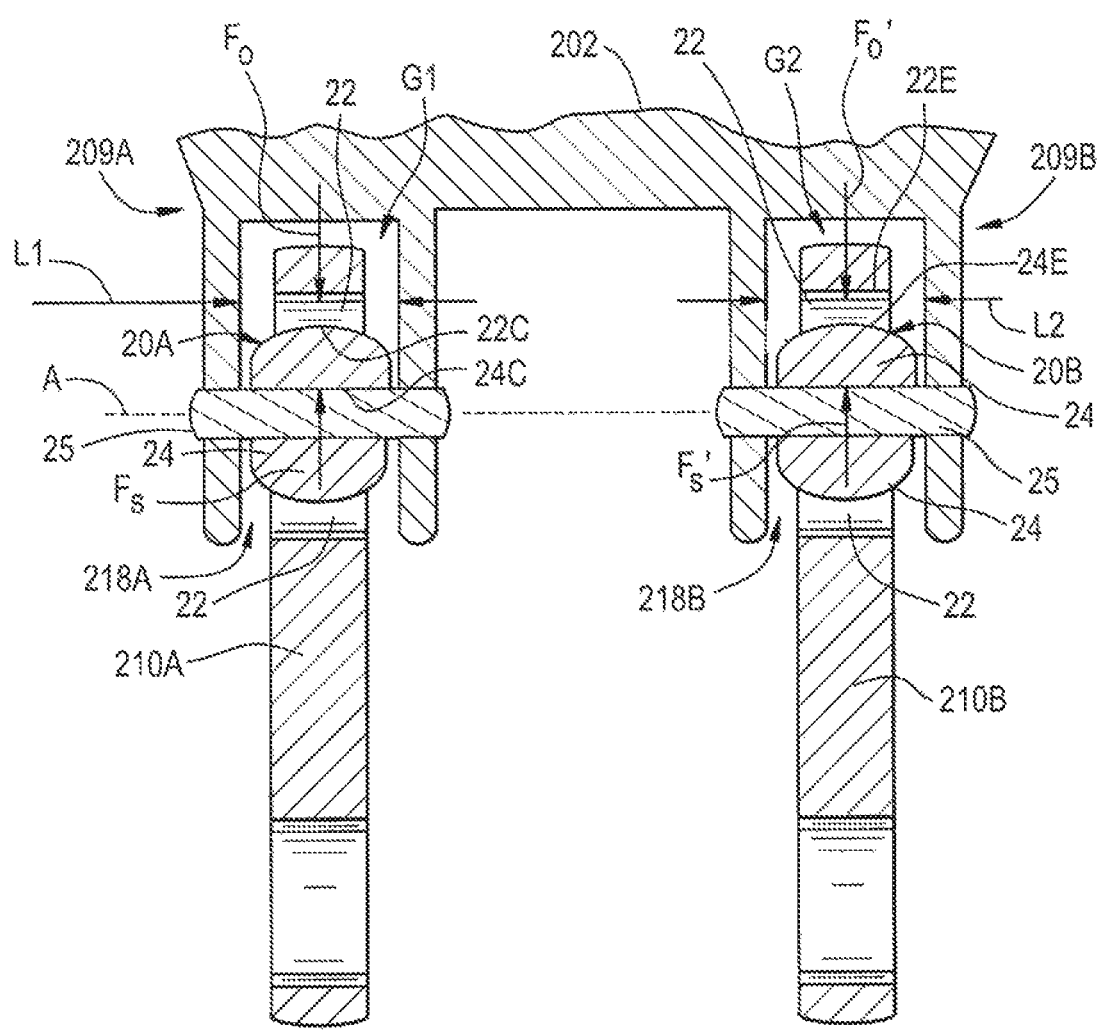
FIG. 12 is a cross sectional partial view of the wishbone links of FIG. 2, taken across section 12-12.
Figure 13:
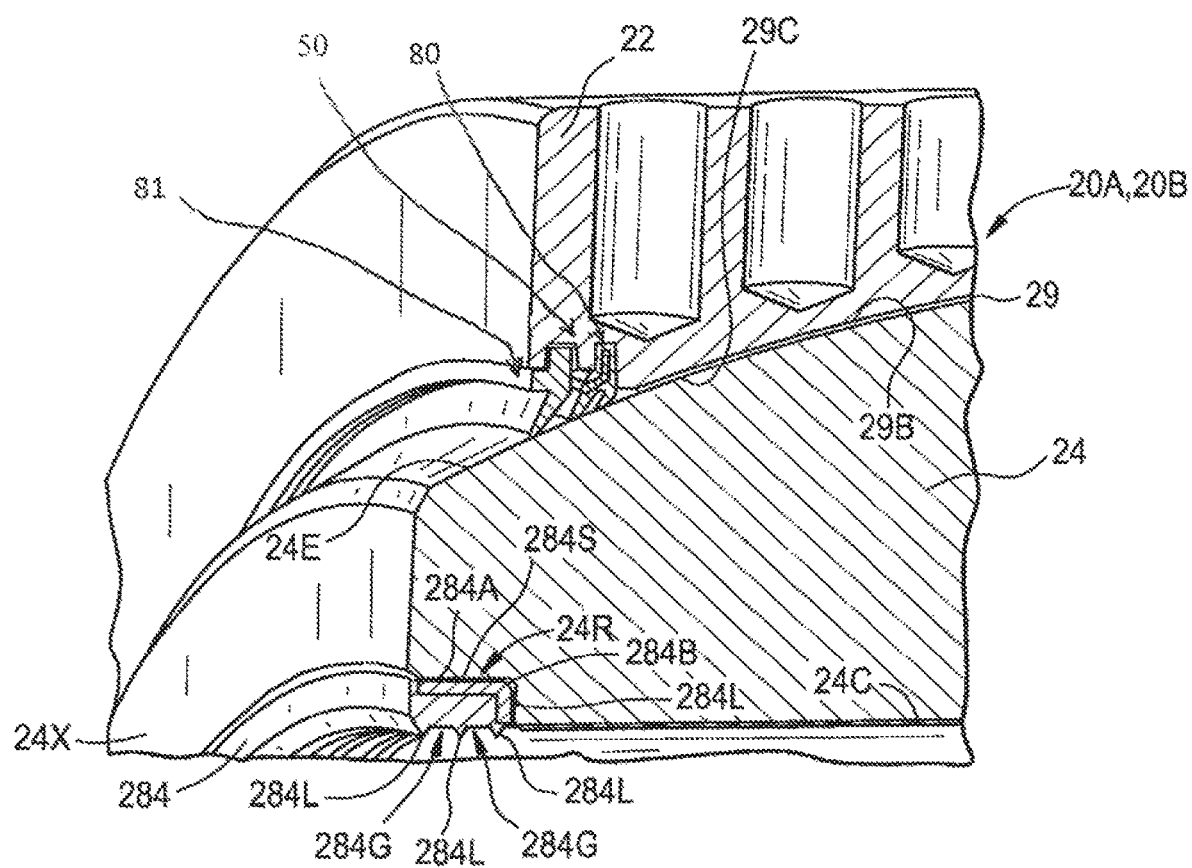
FIG. 13 is an enlarged cross sectional view of the bearings located in the wishbone links of the large mining wheel loader of FIG. 9.

Referring to FIGS. 4B and 6B, the sealing leg 84L has a triple lipped cross section, with three shaft seal lips 84X protruding from the inner member 24 towards the shaft 25A, 25B (depicted in FIG. 12). There are two annular gaps 84Y between adjacent pairs of shaft seal lips 84X. In some embodiments, the annular gaps 84Y provide lubricant reservoirs sealed against the shaft 25A, 25B by the shaft seal lips 84X. In some embodiments, the annular shaft seal 284 as depicted in FIG. 13 is employed in the recess 24R.

As shown in FIG. 4B, a retaining ring 85 (e.g., a metallic ring) is embedded in the annular shaft seal 84. In one embodiment, the retaining ring 85 has an L-shaped cross section that extends inside the anchor leg 84A and partly into the flexible bend 84B.

Figure 8:
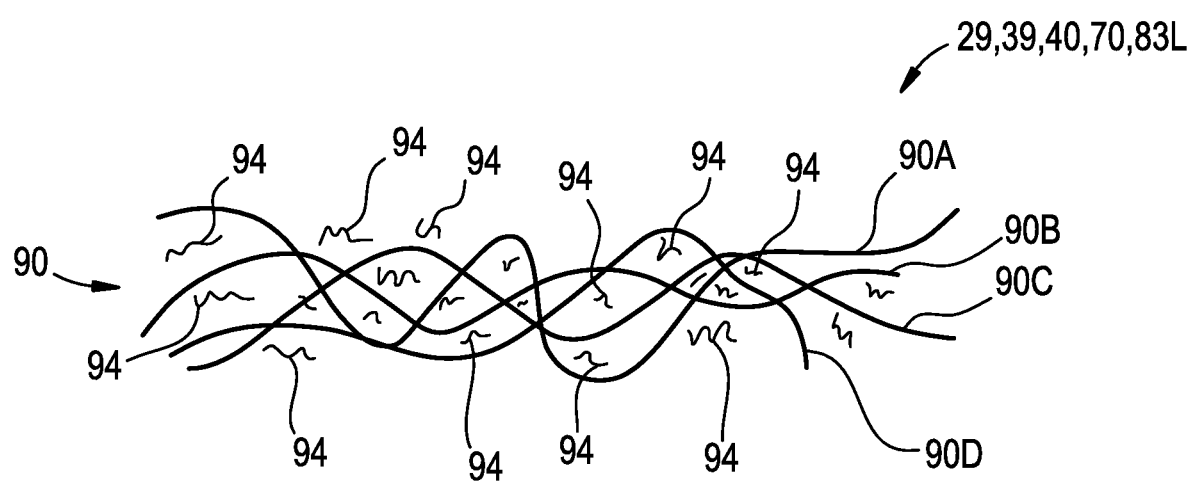
FIG. 8 is a schematic illustration of a woven liner.

In one embodiment, the first lubricious liner 29, the second lubricious liner 39, the third lubricious liner 40, the fourth lubricious liner and/or the low friction liner 83L are manufactured from a polytetrafluoroethylene (PTFE) material. In one embodiment, the first lubricious liner 29, the second lubricious liner 39, the third lubricious liner 40, the fourth lubricious liner and/or the low friction liner 83L are manufactured from a moldable or fabric material. In one embodiment, the fabric material In one embodiment, as shown for example in FIG. 8, the first lubricious liner 29, the second lubricious liner 39, the third lubricious liner 40, the fourth lubricious liner 70 and/or the low friction liner 83L is a woven fabric 90. The woven fabric 90 includes a plurality of fibers 90A, 90B, 90C, and 90D interwoven with one another and polytetrafluoroethylene (PTFE) 94 interwoven therewith. The fibers 90A, 90B, 90C, and 90D include, for example, a polyester material, a stainless steel material and/or glass material. The fibers 90A, 90B, 90C, and 90D interwoven with the PTFE enhance bondability. In one example, the first lubricious liner 29, the second lubricious liner 39, the third lubricious liner 40, the fourth lubricious liner 70 and/or the low friction liner 83L is Lubron® TF woven PTFE fabric liner, which is commercially available from Roller Bearing Company of America®, Oxford, Conn., United States. Other examples include Uniflon® liner systems and Fibriloid® liner systems commercially available from Roller Bearing Company of America®, Oxford, Conn., United States. The first lubricious liner 29, the second lubricious liner 39, the third lubricious liner 40, the fourth lubricious liner 70 and/or the low friction liner 83L have properties and characteristics sufficient to withstand high loads with insignificant wear. It should understood that the specific examples provided above are for illustration purposes only and are not intended to limit the present invention to any specific brand or type of lubricious liner.

The inner members 24 and 34 may be made from a steel or other metallic based alloy including, but not limited to, aluminum, titanium, nickel, copper, cobalt, and the like. For example, the first inner member 24 may be made from AISI 52100, AISI 440C, 4340 or 4130 alloy steel, 17-4PH, 15-5PH, or 13PH-8MO. It is also contemplated that the first inner member 24 may be made from other materials that are sufficiently hard or can be sufficiently hardened through heat treatment or surface treatment. The inner members 24 and 34 made from any of the foregoing materials may be chrome plated.

The outer rings 22 and 32 may be made from steel or an alloy steel, including, but not limited to, 4340, 4130, 17-4PH, 15-5PH, or 13PH-8MO, or another suitable material. It is also contemplated that the outer rings 22 and 32 may be made of a material that provides for a sufficient mating surface for either a self-lubricating coating composition on the contoured surface of the inner members 24 and 24, or for a greased metal-on-metal bearing. The outer rings 22 and 32 and the inner members 24 and 34 may be made of the same or different materials.

The shafts 25 and 35 may be made from a steel alloy.

Figure 9:
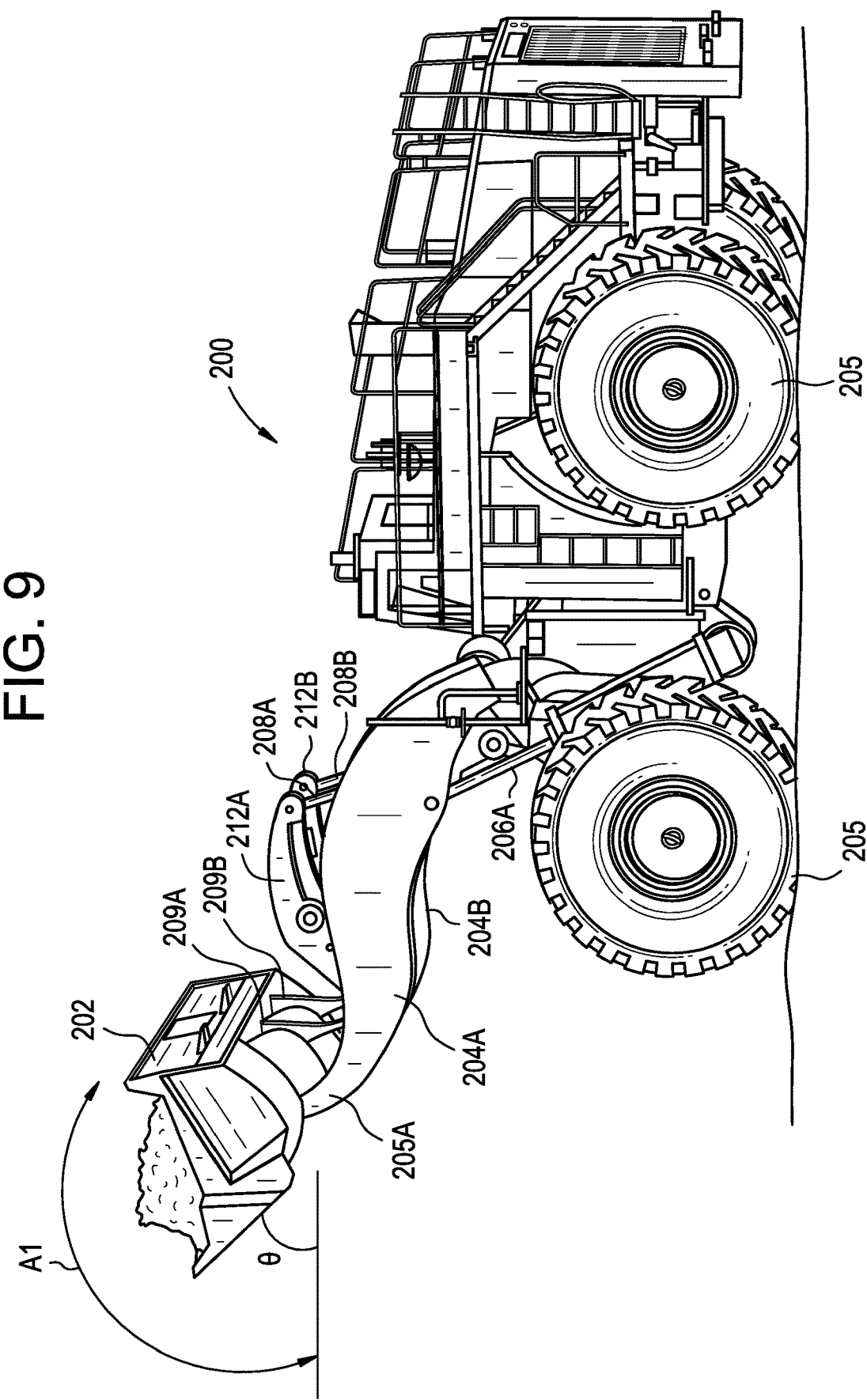
FIG. 9 is a perspective view of a large mining wheel loader.
Figure 10:
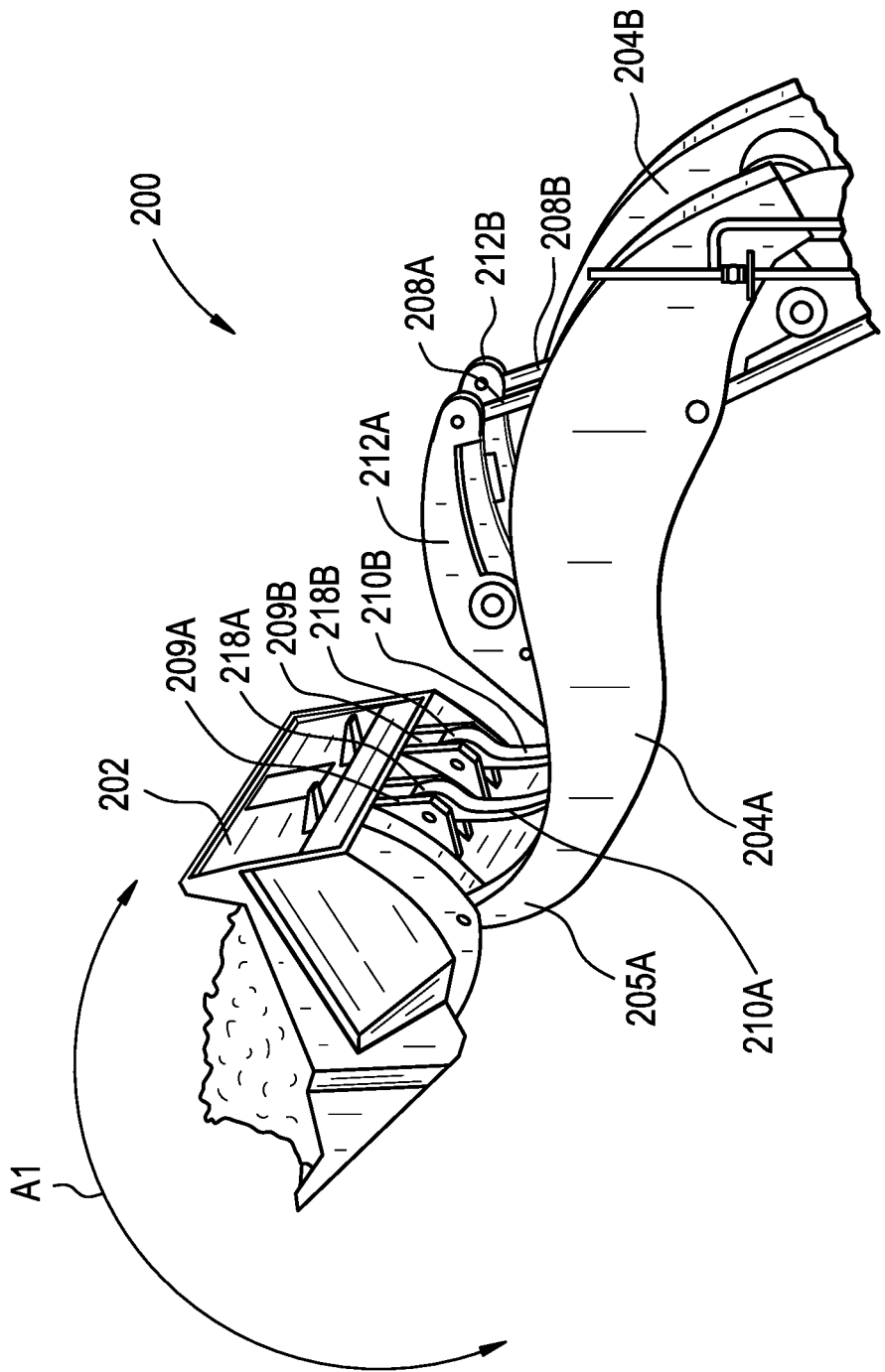
FIG. 10 is an enlarged perspective view of the wishbone links and bucket of the large mining loader of FIG. 9.

FIGS. 9-13 depict an alternate embodiment in which the spherical bearing is incorporated into a wishbone link for a large mining wheel loader. Referring to FIG. 10, the wishbone link for large mining wheel loaders (e.g., a front-end loader or the like) is generally designated by the numeral 210A, 210B. A pair of booms 204A, 204B extend from large mining wheel loader 200 and the bucket 202 engages the wishbone links 210A, 210B to enable tilting of a bucket 202. The bucket 202 pivotally engages the boom 204A at a tip 205A and the boom 204B at a tip 205B. Clevis 209A extends from the bucket 202 to pivotally engage the wishbone link 210A and clevis 209B extends from the bucket 202 to pivotally engage the wishbone link 210B.

Figure 11:
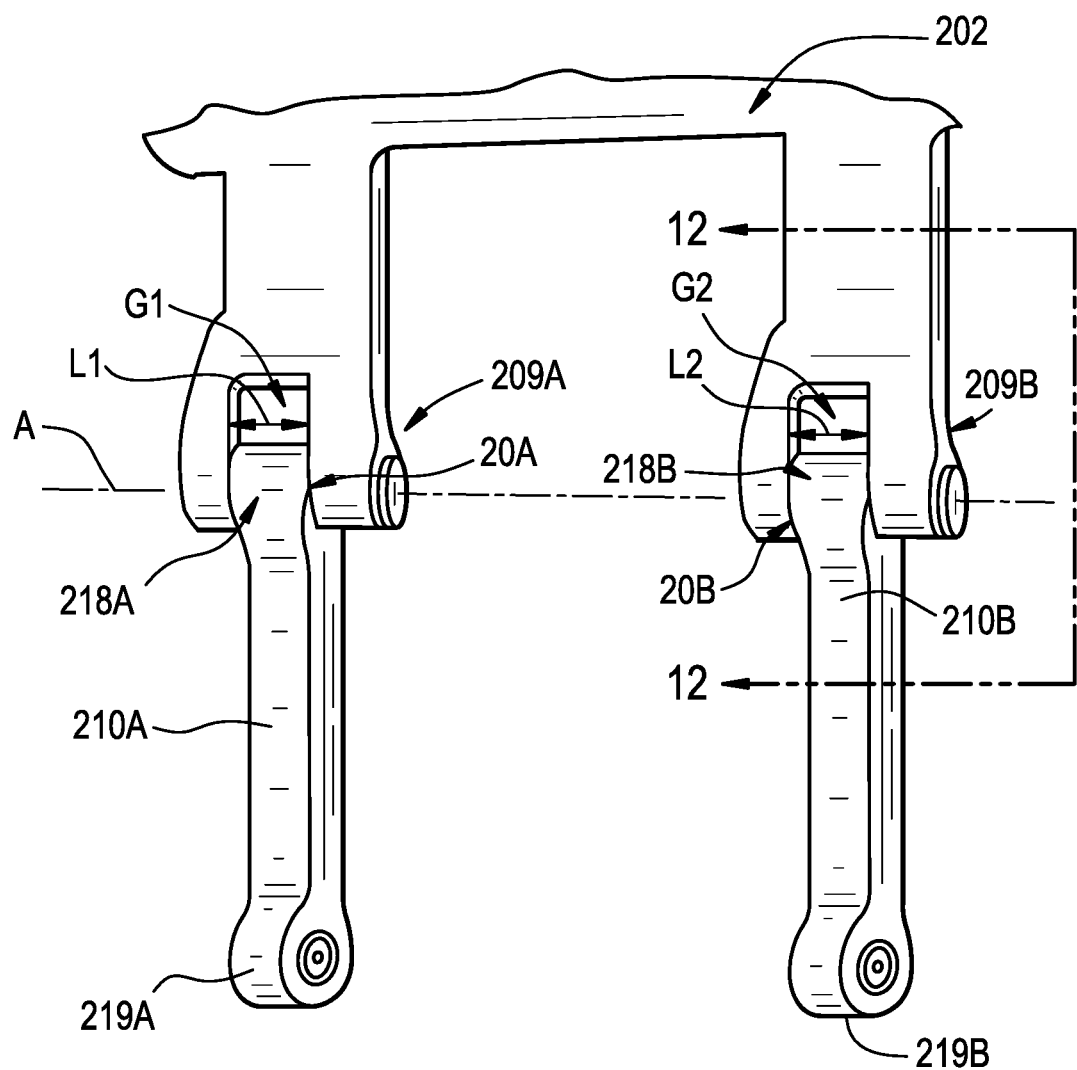
FIG. 11 is an enlarged perspective partial view of the wishbone links and bucket of the large mining wheel loader of FIG. 9.

Referring to FIGS. 11 and 12, the wishbone link 210A extends from a first wishbone joint 218A to a second wishbone joint 219A and pivotally engages the clevis 209A via a spherical bearing 20A. The wishbone link 210B extends from a first wishbone joint 218B to a second wishbone joint 219B and pivotally engages the clevis 209B via a spherical bearing 20B. Referring to FIG. 10, the second wishbone joint 219A engages tilt extension 212A, which is rotatably secured to the boom 204A. The tilt extension 212B engages the second wishbone joint 219B and is rotatably secured to the boom 205B.

Referring to FIG. 12, the first wishbone joint 218A includes a bearing and seal arrangement that comprises a spherical bearing 20A disposed in one end of the wishbone link 210A that pivotally and rotationally mounts the first wishbone joint 218A to clevis 213A via a shaft 25A. The first wishbone joint 218B also includes a bearing and seal arrangement that comprises a spherical bearing 20B disposed in one end of the wishbone link 210B that pivotally and rotationally mounts the first wishbone joint 218B to clevis 213B via a shaft 25B. The shafts 25A, 25B are secured (e.g. press fit, interference fit, secured with mechanical fasteners, adhered to, welded to, brazed to or otherwise fixed) into bores extending through the wishbone links 210A, 210B, respectively.

Referring to FIGS. 9 and 10, the movement of bucket 202 is dictated by the activation of the loader bucket lift cylinders 206A, 206B and/or the loader bucket tilt cylinders 208A, 208B. The loader bucket lift cylinder 206A is pivotally mounted to fixed points on the body of the loader 200 and the boom 204A to rotate the boom 204A about the loader 200. The loader bucket lift cylinder 206B is pivotally mounted to fixed points on the body of the loader 200 and the boom 204B to rotate the boom 204B about the loader 200. One end of the loader bucket tilt cylinder 208A is rotatably mounted to a fixed point on the boom 204A and the opposite end engages the tilt extension 212A to rotate the tilt extension 212A relative to boom 204A. One end of the loader bucket tilt cylinder 208B is rotatably mounted to a fixed point on the boom 204B and the opposite end engages the tilt extension 212B to rotate the tilt extension 212B relative to boom 204B. This movement of the tilt extension 212A rotates the bucket 202 relative to the boom 204A about the tip 205A and this movement of the tilt extension 212B rotates the bucket 202 relative to the boom 204B about the tip 205B, as indicated by the arrow A1. The bucket 202 rotates about the tip 205A, 205B an angle θ. In the depicted embodiment θ is up to 120°. The operator controls the loader bucket lift cylinders 206A, 206B and/or the loader bucket tilt cylinders 208A, 208B in conjunction with the wheels 205 of the loader 200 to position and move the bucket 202 in a desired manner.

During operation, the bearings 20A, 20B are subject to forces $F_O$ and $F_S$ (depicted in FIG. 12). These forces act in the radial direction against the exterior and interior surfaces of the bearings 20A, 20B, respectively. The wishbone link 210A exerts exterior force $F_O$ and the wishbone link 210B exerts exterior force $F_O'$, against the outside surface of the outer ring 22 and the shaft 225 exerts interior force $F_S$, $F_S'$ against the inner surface 24C. Exterior forces $F_O$, $F_O'$ and interior forces $F_S$, $F_S'$ rotate about axis A during operation of the bucket 202, causing significant radial stress on the bearings 20A and 20B. The small angle oscillatory movement of bucket 202 compounds this radial stress. Referring to FIG. 4, the exterior forces $F_O$ and $F_O'$ and the interior forces $F_S$ and $F_S'$ differ from one another in magnitude. It is common for one end of the bucket 202 to have a heavier load, subjecting one of the bearings 20A or 20B to significantly higher forces. The bearings 20A and 20B allow the bucket 202 to remain level when subjected to uneven loads without hindering the functionality of the first wishbone joints 218A and 218B.

As shown in FIG. 13, an annular shaft seal 284 is positioned in a recess 24R formed in the cylindrical interior surface 24C of the inner member 24. The annular shaft seal 284 has a triple lipped cross section, with three shaft seal lips 284L protruding from inner member 24 towards the shaft 25A, 25B (depicted in FIG. 12). In one embodiment, the annular shaft seal 284 is made from an elastomer such as synthetic rubber or nitrile rubber. The outer ring 22 has a spherical interior bearing surface 29C and the inner member 24 has a spherical exterior surface 29B. A lubricious liner 29 is disposed between the outer ring 22 and the inner member 24. The spherical bearing 20A, 20B also includes a seal receiving area 50. The seal receiving area 50 has a flexible double lipped annular seal 80 and a scraper seal 81 extending between the outer ring 22 and the inner member 24. The scraper seal 81 is positioned axially outward from the flexible double lipped annular seal 80.

Referring to FIG. 13, there are two annular gaps 284G between adjacent pairs of shaft seal lips 284L. In some embodiments, the annular gaps 284G provide lubricant reservoirs sealed against the shaft 25A, 25B by shaft seal lips 284L. A seal bracket 284S supports the annular shaft seal 284 within the recess 224R. The seal bracket 284S has an L-shaped cross section, defined by anchor leg 284A and a sealing leg 284L connected to one another at a bend 284B. In the depicted embodiment, the seal bracket 284S is isolated from the axial end 24X and the cylindrical interior surface 24C of inner member 24 by the annular shaft seal 284. In some embodiments, the annular shaft seal 84 depicted in FIGS. 4A, 4B, 6A, and 6B is employed in recess 224R.

Although the present invention has been disclosed and described with reference to certain embodiments thereof, it should be noted that other variations and modifications may be made, and it is intended that the following claims cover the variations and modifications within the true scope of the invention.

What is claimed is:

1. A bearing and seal arrangement for an articulated joint, the bearing and seal arrangement comprising:
    a first spherical bearing comprising a first outer ring surrounding a first inner member, the first outer ring having a first spherical interior bearing surface, the first inner member having a first spherical exterior surface, a first lubricious liner disposed between the first outer ring and the first inner member, and at least one first seal receiving area having an axially extending first width;
    a second spherical bearing comprising a second outer ring surrounding a second inner member, the second outer ring having a second spherical interior bearing surface, the second inner member having a second spherical exterior surface, a second lubricious liner disposed between the second outer ring and the second inner member, and at least one second seal receiving area having an axially extending second width that is greater than the first width;
    the first spherical bearing and the second spherical bearing being aligned coaxially with one another;
    the at least one first seal receiving area having a flexible double lipped annular seal and a scraper seal positioned therein and extending between the first outer ring and the first inner member, the scraper seal being positioned axially outward from the flexible double lipped annular seal; and
    the at least one second seal receiving area having a boot seal positioned therein and extending between the second outer ring and the second inner member.

2. The bearing and seal arrangement of claim 1, wherein the boot seal has a low friction liner positioned thereon, the low friction liner being in sliding engagement with a portion of the second inner member.

3. The bearing and seal arrangement of claim 2, wherein the second inner member has a circumferential groove formed therein, and wherein the low friction liner is slidingly seated in the groove.

4. The bearing and seal arrangement of claim 1, wherein the inner member has a first cylindrical interior surface defining a first bore extending therethrough, the second member having a second cylindrical interior surface defining a second bore extending therethrough and comprising an annular shaft seal positioned in at least one recess formed in at least one of the first cylindrical interior surface and the second cylindrical interior surface.

5. The bearing and seal arrangement of claim 4, wherein the annular shaft seal has a C-shaped cross section, defined by an anchor leg and a sealing leg connected to one another by a flexible bend.

6. The bearing and seal arrangement of claim 5, wherein the anchor leg and the sealing leg are spaced apart from one another by a gap therebetween.

7. The bearing and seal arrangement of claim 1, further comprising at least one of:
a third lubricious liner engaging the first cylindrical interior surface; and
a fourth lubricious liner engaging the second cylindrical interior surface.

8. The bearing and seal arrangement of claim 1, wherein at least one of the first lubricious liner and the second lubricious liner comprises polytetrafluoroethylene.

9. The bearing and seal arrangement of claim 1, wherein at least one of the first outer ring and the second outer ring comprise at least two axially extending fractures therethrough.

10. An articulated joint comprising:
a first structure comprising:
a first support arm terminating in a first clevis, the first clevis having a first flange and a second flange spaced apart from one another by a first gap that has a first length;
a second support arm terminating in a second clevis, the second clevis having a third flange and a fourth flange spaced apart from one another by a second gap having a second length, that is greater in magnitude than the first length;
a second structure comprising:
a third support arm having a fifth flange extending therefrom;
a fourth support arm having a sixth flange extending therefrom;
the fifth flange being positioned generally between the first flange and the second flange of the first clevis and pivotally connected thereto;
the sixth flange being positioned generally between the third flange and the fourth flange of the second clevis and being pivotally connected thereto;
a first spherical bearing moveably connecting the first clevis to the fifth flange, the first spherical bearing comprising:
a first outer ring surrounding a first inner member, the first outer ring having a first spherical interior bearing surface, the first inner member having a first spherical exterior surface, a first lubricious liner disposed between the first outer ring and the first inner member, and at least one first seal receiving area having an axially extending first width;
a second spherical bearing moveably connecting the second clevis to the sixth flange, the second spherical bearing comprising:
a second outer ring surrounding a second inner member, the second outer ring having a second spherical interior bearing surface, the second inner member having a second spherical exterior surface, a second lubricious liner disposed between the second outer ring and the second inner member, and at least one second seal receiving area having an axially extending second width that is greater than the first width;
the first spherical bearing and the second spherical bearing being aligned coaxially with one another;
the at least one first seal receiving area having a flexible double lipped annular seal and a scraper seal positioned therein and extending between the first outer ring and the first inner member, the scraper seal being positioned axially outward from the flexible double lipped annular seal; and
the at least one second seal receiving area having a boot seal positioned therein and extending between the second outer ring and the second inner member.

11. The articulated joint of claim 10, wherein the boot seal has a low friction liner positioned thereon, the low friction liner being in sliding engagement with a portion of the second inner member.

12. The articulated joint of claim 11, wherein the second inner member has a circumferential groove formed therein, and wherein the low friction liner is slidingly seated in the groove.

13. The articulated joint of claim 10, wherein the inner member has a first cylindrical interior surface defining a first bore extending therethrough, the second member having a second cylindrical interior surface defining a second bore extending therethrough and comprising an annular shaft seal positioned in at least one recess formed in at least one of the first cylindrical interior surface and the second cylindrical interior surface.

14. The articulated joint of claim 13, wherein the annular shaft seal has a C-shaped cross section, defined by an anchor leg and a sealing leg connected to one another by a flexible bend.

15. The articulated joint of claim 14, wherein the anchor leg and the sealing leg are spaced apart from one another by a gap therebetween.

16. The articulated joint of claim 10, further comprising at least one of:
a third lubricious liner engaging the first cylindrical interior surface; and
a fourth lubricious liner engaging the second cylindrical interior surface.

17. The articulated joint of claim 10, wherein at least one of the first lubricious liner and the second lubricious liner comprises polytetrafluoroethylene.

18. The articulated joint of claim 10, wherein at least one of the first outer ring and the second outer ring comprise at least two axially extending fractures therethrough.

19. The articulated joint of claim 10, wherein the first support arm is vertically above the second support arm.

20. A bearing and seal arrangement, comprising:
a first spherical bearing comprising an outer ring surrounding an inner member, the outer ring having a spherical interior bearing surface, the inner member having a spherical exterior surface, a lubricious liner disposed between the outer ring and the inner member, and at least one seal receiving area; and
the seal receiving area having a flexible double lipped annular seal and a scraper seal positioned therein and extending between the outer ring and the inner member, the scraper seal being positioned axially outward from the flexible double lipped annular seal.

21. The bearing and seal arrangement of claim 20, further comprising a second spherical bearing, first spherical bearing and the second spherical bearing being aligned coaxially with one another.

22. The bearing and seal arrangement of claim 20, wherein the inner member has a cylindrical interior surface defining a bore extending therethrough and comprising an annular shaft seal positioned in at least one recess formed in the cylindrical interior surface.

23. The bearing and seal arrangement of claim 22, wherein the annular shaft seal has a C-shaped cross section, defined by an anchor leg and a sealing leg connected to one another by a flexible bend.

24. The bearing and seal arrangement of claim 23, wherein the anchor leg and the sealing leg are spaced apart from one another by a gap therebetween.

25. The bearing and seal arrangement of claim 22, wherein a retaining ring is embedded in the annular shaft seal, the retaining ring having an L-shaped cross section.

26. The bearing and seal arrangement of claim 22, wherein the annular shaft seal has triple lipped cross section, with three shaft seal lips protruding radially inward from the inner member.

27. The bearing and seal arrangement of claim 20, wherein the lubricious liner comprises polytetrafluoroethylene.

28. The bearing and seal arrangement of claim 20, wherein the outer ring comprises at least two axially extending fractures therethrough that define a junction between a first outer ring segment and a second outer ring segment.

* * * * *